Jan. 23, 1968   B. A. KUDER   3,365,566
WELDING PROCESS
Filed Aug. 17, 1965   2 Sheets-Sheet 1
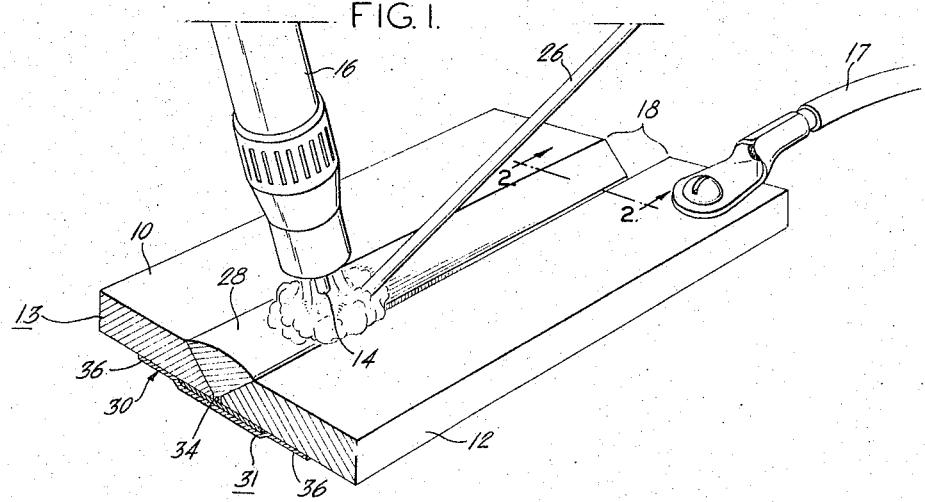
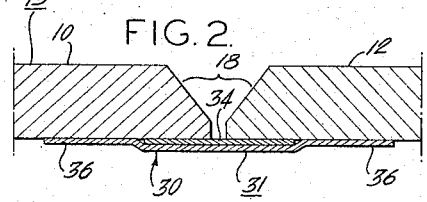
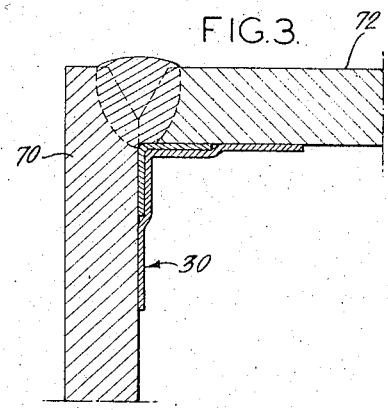
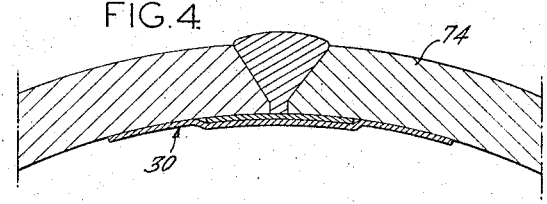
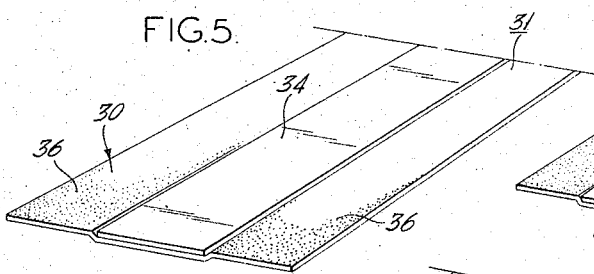
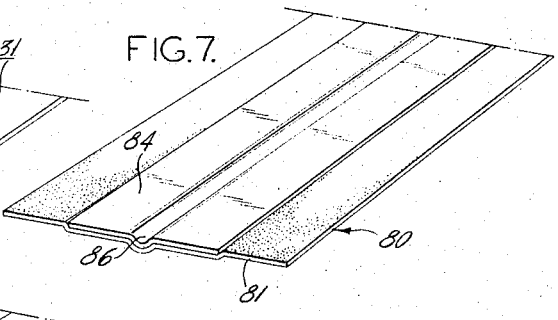
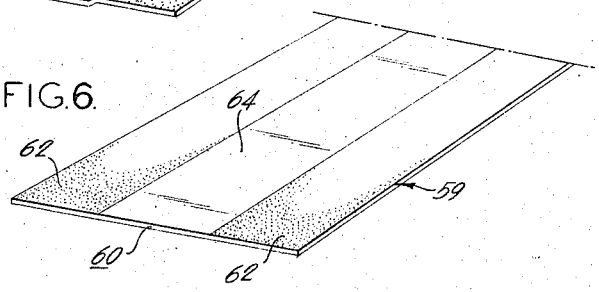
INVENTOR:
BENEDICT A. KUDER
BY Howson & Howson
ATTYS.

Jan. 23, 1968  B. A. KUDER  3,365,566
WELDING PROCESS
Filed Aug. 17, 1965  2 Sheets-Sheet 2

INVENTOR:
BENEDICT A. KUDER
BY Howson & Howson
ATTYS.

United States Patent Office 3,365,566
Patented Jan. 23, 1968

3,365,566
WELDING PROCESS
Benedict A. Kuder, 130 Long Lane,
Upper Darby, Pa. 19082
Continuation-in-part of application Ser. No. 323,817,
Nov. 14, 1963. This application Aug. 17, 1965, Ser.
No. 480,402
12 Claims. (Cl. 219—160)

ABSTRACT OF THE DISCLOSURE

A weld backup tape for sealing the underside of a weldment comprising an elongated, thin, flexible metallic strip and a layer of fibrous material disposed centrally of the strip exposing side edge portions of the metallic strip, the exposed side edge portions on one face of the strip to which the fibrous material is secured being provided with an adhesive so that the backup may be secured in a relatively airtight manner to the underside of the weldment.

---

The present invention relates to a process for electric welding and more particularly to an improvement in the art of shielded welding.

This is a continuation-in-part application of my prior application entitled, "Welding Process," Ser. No. 323,817, filed Nov. 14, 1963, and now abandoned.

In conventional electric welding processes, for example, inert gas arc welding illustrated for example in FIG. 1 of the drawing, an arc is struck between a single tungsten or carbon electrode and the work to be welded. A shield of an inert, monotomic gas is usually provided around the electrode and the filler metal is introduced in the arc struck by the electrode in the region of the gas shield whereby the filler metal is melted and laid in the joint of the pieces to be joined together. The inert gas envelope or shield serves to protect the electrode and the molten metal forming the weld from oxidation.

In order to produce a high quality weld, it is usually the practice to back up the underside of the joint to be welded to prevent the underside of the weld from being exposed to the atmosphere which might contaminate the weld while in the molten state.

Exposure to the atmosphere results in possible weld porosity and/or poor surface appearance. In addition, the weld backup prevents the weld puddle from dropping through by drawing away from the work piece some of the heat generated by the intense arc and also by physically supporting the weld puddle. A common type of weld backup is the use of flat metal backup bar supported against the underside of a joint between two flat work pieces or ring-like members machined to fit interiorly behind the joint or ends of tubes to be welded together. In some instances an inert gas shield is provided on the underside of the weld joint and in other instances the gas shield is used in combination with the backup bars or rings.

These presently known backup procedures add considerably to the cost of the welding process. For example, in instances where tubular members are joined end to end, the ring-like backup fixture must be extremely accurately machined to provide a precise fit between the ends of the tubular members to be joined. Cost of machining these ring-like fixtures is high and an additional cost is imposed where an inert gas is used in combination with the fixture. Moreover, in some instances, the backup surface of the members is not smooth, the backup bar or ring used by itself does not completely exclude the underside of the weld from the atmosphere and hence is not fully effective in preventing oxidation. Additionally, the cost of fixtures rises sharply for irregular weldment configuration such as those required for corner joints and the like.

The present invention provides a backup tape for weldments for use in welding processes and which eliminates the need for backup bars and/or inert gas shielding the underside of the weldment joint. In accordance with the present invention, a preferred form of backup tape comprises a layer of ribbon of flexible heat-resistant material such as glass cloth having an adhesive surface on one side thereof and a thin metal layer or foil preferably a copper or aluminum alloy adhered to the adhesive surface of the ribbon of a narrower width to expose the adhesive on opposite sides of the metal layer. This tape is adapted to be applied to the underside of the weld so that the copper or aluminum alloy layer overlies the joint and the adhesive edges of the ribbon adhere the tape in place on the weldment. The backup tape of the present invention may be applied easily and quickly to a variety of weldments as illustrated in the drawings and is fully effective for the purposes intended. The tape serves to protect the underside of the weld from atmospheric contamination and serves to support the weld as it is being formed whereby the underside of the weld produced in most instances required little or no finishing or post-welding cleaning operations.

The backup tape of the present invention reduces the overall cost of welding procedures by eliminating the need for expensive backup fixtures and/or the cost of an inert gas to provide an inert atmosphere in the region of the underside of the weld.

With the foregoing in mind, an object of the present invention is to provide a backup tape for weldments which is of comparatively simplified construction, may be manufactured easily and economically, may be applied to the joint of the weldment easily and quickly and which is fully effective for the purposes intended.

A further object of the present invention is to provide an improvement in the art of shielded welding which greatly reduces the cost of presently known methods.

These and other objects of the present invention and the various features and details of the backup tape and the process of shielded welding are hereinafter more fully set forth with reference to the accompanying drawings, wherein;

FIG. 1 is a perspective view illustrating a conventional electric welding process employing a backup tape in accordance with the present invention;

FIG. 2 is an enlarged sectional view taken on lines 2—2 of FIG. 1;

FIG. 3 is a sectional view of a corner joint to be welded employing a backup tape in accordance with the present invention;

FIG. 4 is a cross section of the joint of arcuate members to be welded employing the tape of the present invention;

FIGS. 5, 6 and 7 are perspective views of various forms of backup tapes in accordance with the present invention;

Figure 8:
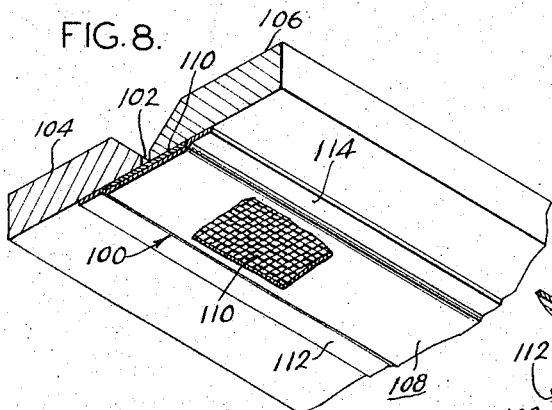
FIG. 8 is a perspective view of a weldment with still another form of backup tape in accordance with the present invention applied thereto.

Referring now to the drawing and particularly to FIG. 1 thereof, there is illustrated a conventional electric welding apparatus for use in welding structural plate members 10 and 12 of a weldment 13 to one another. The apparatus as illustrated includes a tungsten or carbon electrode 14 which is connected to a suitable source of electrical power and which is mounted centrally of a cylindrical cup 16 and a lead 17 connecting one of the members to ground. Inert gas from a suitable source is delivered through the cup 16 to provide a shield adjacent the tip of the electrode 14. The plate members 10 and 12 to be joined are maintained in spaced apart relation in a conventional manner to define a joint 18 therebetween. By this arrangement a filler metal 26 may be introduced in the arc struck by the electrode 14 to form the bead 28 joining the structural members together at the joint 18.

In accordance with the present invention, means is provided for backing up the underside of the weld to protect the underside from atmospheric contamination and also to serve as a means for supporting the weld bead to provide a finish on the underside which requires a minimum of post welding cleaning. The backup means comprises, in the present instance, a backup tape 30 which in the form shown in FIG. 5 comprises an elongated flexible layer or ribbon 31 of a heat-resistant material such as glass cloth having an adhesive surface and a thin metallic layer or foil 34 preferably a copper or aluminum alloy adhered to the adhesive surface on one side of the ribbon 31 and disposed centrally thereof to expose regions 36 of the adhesive surface on the opposite sides of the metallic foil 34 for adhering the tape to the underside of a weldment 13. The layer or foil 34 is preferably between 0.003 and 0.009 inch in thickness.

Thus, in the process of preparing the weldment 13 employing the backup tape of the present invention, the joint surfaces of the weldment 13 are cleaned in the usual manner and the plate members 10 and 12 of the weldment 13 are supported to define the joint 18. Thereafter, the backup tape 30 is applied to the underside of the joint 18 with the metallic layer 34 confronting and covering the joint 18 as illustrated and the adhesive regions of the ribbon 31 bonded to the members to support the tape 30 in position as indicated. The weldment 13 is now ready for welding whereby in the process shown, the arc is struck by the electrode 14 and the weld rod 26 placed in the region of the arc to provide the weld puddle. In the preferred form, the backup tape 30 is made of a ribbon 31 of glass cloth having high heat resistance and the metallic layer 34 is of a metal dissimilar from the material of the weldment 13 to minimize the chance of the layer fusing or becoming bonded to the weldment. Thus, if the members to be welded are steel, or aluminum, the layer of the tape is preferably copper. After the welding is completed, the tape 30 is merely peeled off and discarded.

Tests conducted with the backup tape of the present invention demonstrate that the tape effectively precludes the atmosphere thereby eliminating the possibility of contaminating the weld and provides a good support for the weld puddle to produce a finished weld that requires little or no post-weld cleaning.

FIGS. 3 and 5 demonstrate other weldment configurations with which the backup tape 30 may be suitably employed. FIG. 3 shows a corner joint wherein the members 70 and 72 to be joined are disposed at right angles and the joint illustrated in FIG. 4 may be that of a plate 74 bent to form a cylinder. Note that in the corner joint of FIG. 3, the flexibility of the tape 30 lends itself readily to provide a snug air-tight backup.

Still another form of tape 59 in accordance with the present invention is illustrated in FIG. 6. The tape shown comprises a thin metallic layer 60 preferably an aluminum or copper alloy and of a thickness between 0.003 and 0.009 inch having adhesive on one surface thereof on regions 62 adjacent opposite side edges thereof to define a non-adhesive area 64 along the center portion thereof. This tape 59 is applied to a weldment in the same manner as the first tape; that is, by positioning the tape over the joint so that the non-adhesive area 64 overlies the joint of the weldment.

There is illustrated in FIG. 7 still another form of backup tape 80 in accordance with the present invention. The tape 80 is similar to the tape 30 shown in FIGS. 1–5 inclusive comprising a layer or ribbon 81 of heat-resistant material and a thin metallic layer or foil 84 adhered centrally to the adhesive surface on one side of the ribbon 81. In the present instance, the layer or foil 84 is provided with a longitudinally extending indentation or groove 86 adapted to be aligned with the joint of a weldment in instances where it is desired to have the weld bead project beyond the underside of the weldment.

Figure 9:
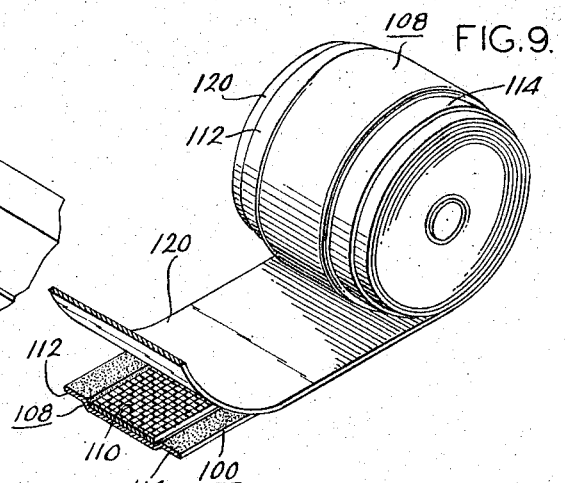
FIG. 9 is a perspective view of the backup tape shown in FIG. 8 in roll form prior to application to a weldment.

There is illustrated in FIGS. 8 and 9 yet another form of a backup tape 100 in accordance with the present invention. The tape 100 is adapted to be applied over the joint 102 of plate members 104 and 106 of a weldment assembly. The tape 100 comprises an elongated, thin, flexible metallic strip 108 made, for example, of aluminum and an elongated layer or ribbon 110 of fibrous material adhered to one face of the metallic strip 108 and being of a smaller width to expose opposite side edge portions 112 and 114 of the strip. The layer of fibrous material 110 is adhered to the metallic strip 108 by suitable adhesive and the exposed edge portions of the metallic strip are also provided with a suitable adhesive so that the tape may be applied over the joint of a weldment as shown in FIG. 8 with the layer 110 confronting the bottom side of the joint 102. The layer of fibrous material is preferably a woven fiberglass fabric; that is, a fabric comprised of glass fibers which are non-flammable, are not affected by moisture and most acids and are rust, rot and mildew proof. In the present instance the layer 110 is a plain weave of fiberglass yarns.

This tape provides an air-tight seal on the underside of the weldment, thus preventing oxidation and contamination by protecting the molten metal from the atmosphere during application of the weld. Further, use of the tape minimizes or eliminates post weld finishing operations such as grinding, chipping, etc., by reason of the fact that an extremely high finish on the underside of the weld results. Moreover, the fiberglass layer 110 is in direct contact with the molten metal and becomes a molten flux floating on the surface of the molten weld. It has been found that the finished weld on the bottom surface of the weldment is characterized by a highly polished surface similar to a chrome finish. This tape may be supplied in roll form as shown in FIG. 9 wherein a thin paper cover strip 120 is applied over the surface of the tape which confronts the weldment and is held thereto on the adhesive faces of the side edge portions of the metallic strip 108. The paper cover strip 120 is removed prior to applying the tape to a joint.

Figure 10:
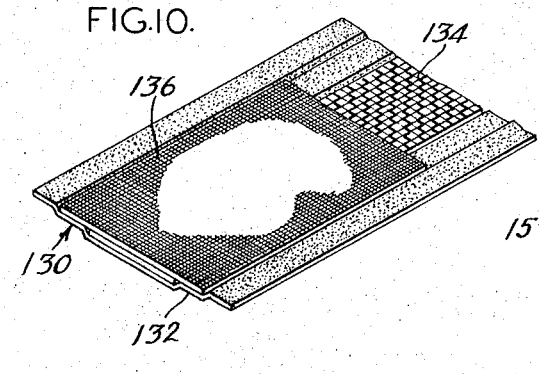
FIG. 10 is a perspective view of still another form of backup tape in accordance with the present invention.

FIG. 10 illustrates another embodiment of backup tape 130 in accordance with the present invention. This tape is similar to the embodiment shown in FIG. 8 and described above and includes an elongated, flexible, thin, metallic strip 132 made, for example, of aluminum, a first elongated layer 134 of fibrous material, for example, a woven fiberglass disposed centrally of the strip 132 to expose side edge portions thereof and a second layer 136 of fibrous material, for example, a woven fiberglass superimposed over the first layer and of a greater width so that it is adhered to a portion of the side edge of the strip 132. If desired, the layers 134 and 136 may be of the same width and sewn together.

As illustrated in the drawings, the first layer 134 is a thicker, heavier weave and the second layer 136 which confronts the weldment joint is a finer lighter weave. This tape may be used in heavy duty welding applications where there is danger of burning through a single layer of fibrous material. This type may also be made of two layers of finer weave fiberglass for a smoother finish.

Figure 11:
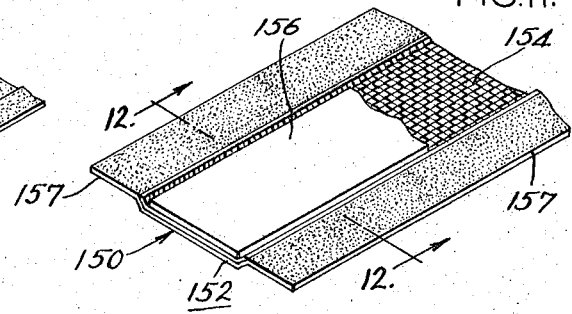
FIG. 11 is a perspective view of yet another form of backup tape in accordance with the present invention.

FIG. 11 is still another form of backup tape 150 in accordance with the present invention. This tape 150 is similar to that shown in FIG. 8 comprising an outer elongated, flexible, thin metallic strip 152, for example of aluminum, and a central layer of fibrous material 154 such as woven fiberglass of smaller cross section to expose side edge portions thereof. In the present instance a filler 156 of cardboard of a width slightly narrower than the width of the fiberglass layer 154, overlies the layer 154. In the use of this tape, the entire assembly is placed over the joint 153 of a weldment 155, being held in place by the adhesive side edge faces 157 of the strip 152. The filler 156 is then pulled out to provide a groove 160 between the fiberglass and the bottom face of the weldment members. This groove may be filled with an inert gas during the welding operation.

Figure 14:
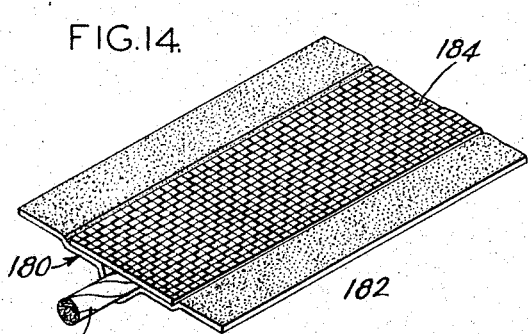
FIG. 14 is a perspective view of a further form of backup tape in accordance with the present invention.
Figure 13:
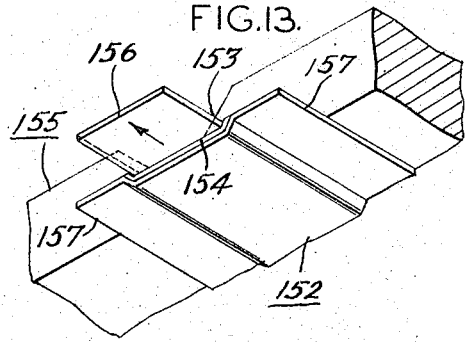
FIG. 13 is a perspective view of a weldment with the form of backup tape shown in FIG. 11 applied to the joint thereof.

Another form of a backup tape 180 in accordance with the present invention is illustrated in FIG. 14. This tape 180 is similar to that shown in FIG. 11 comprising an elongated, thin, flexible, metallic strip 182, for example of aluminum, and a central layer 184 of woven fiberglass of narrower width than the strip 182 and adhered thereto by a suitable adhesive. In the present instance, the assembly further includes a filler 183 in the form of a cord. When this tape assembly is applied at the underside of a weldment, the cord 183 is left in to provide additional backup, and is mainly used on double V type butt joints.

Figure 15:
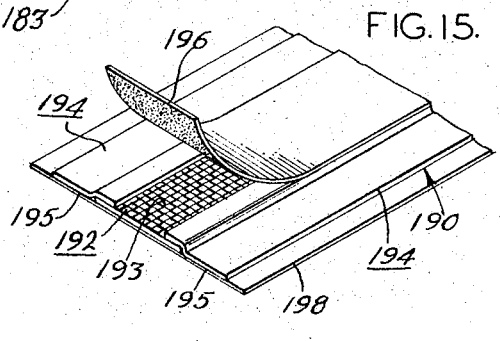
FIG. 15 is a perspective view of still a further form of backup tape in accordance with the present invention.
Figure 12:
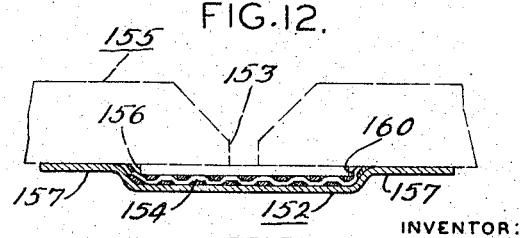
FIG. 12 is a sectional view of the tape shown in FIG. 11 taken on lines 12—12 of FIG. 11.

A further form of backup tape 190 in accordance with the present invention is shown in FIG. 15. The tape 190 comprises a central layer 192 of fibrous material such as woven fiberglass, a pair of elongated, thin, flexible metallic strips 194 for example of aluminum adhered to opposite side edges of the layer 192 exposing both faces thereof and an elongated thin, flexible metallic cover 196 of aluminum adhered to the back face 193 of layer 192. The tape assembly further includes a paper cover strip 198 adhered to the adhesive faces 195 of the strips 194 and which is peeled off when it is desired to apply the tape to a weldment.

This tape may be applied to a weldment in exactly the same way that the tape shown in FIG. 8 is applied to a weldment. However, in the present instance, if more backup is required for a particular welding procedure, the cover 196 is simply peeled back and another tape superimposed on the first tape, sort of "piggy-back" style. This tape is mainly used for heavy gages. The purpose of the peel-back strip of aluminum 196 is to prevent molten aluminum from contaminating the underside of the weld in the event of burn-through into the aluminum tape or cover 196.

It is noted that the backup tapes shown in FIGS. 10, 11, and 14 may also be supplied in roll form as shown in FIG. 9 and provided with a thin paper cover strip detachably adhered to the adhesive outer side edge portions of the metallic strip. In the form shown in FIG. 11, the paper strip would serve to hold the filler in place.

While particular forms of backup tape in accordance with the present invention have been illustrated and described herein, it is not intended to limit the invention and changes and modifications may be made therein within the scope of the following claims.

I claim:

1. A backup tape for shielding the underside of a weldment joint comprising an elongated, flexible, thin metallic strip and an elongated, flexible layer of fibrous material adhered to one face of said strip centrally thereof and being of a width narrower than said metallic strip to expose side edge portions thereof, said exposed side edge portions having an adhesive coating to provide a substantially air-tight sealing engagement with the weldment joint along both edges of the tape, the flexibility of the fibrous layer and metallic strip permitting conformation of the tape to the shape of the weldment.

2. A backup tape as claimed in claim 1 wherein said fibrous material is a woven fiberglass.

3. A backup tape as claimed in claim 1 including a thin paper cover strip overlying the layer of fibrous material and adhered to the outer adhesive side edge portions of said metallic strip.

4. A backup tape for shielding the underside of a weldment comprising an elongated, thin, metallic strip, a first elongated, flexible layer of fibrous material disposed centrally of said strip and adhered thereto to expose side edge portions, and a second layer of fibrous material superimposed over said first layer and of a greater width than said first layer, said exposed side edge portions having an adhesive coating to provide a substantially air-tight sealing engagement with the weldment joint along both edges of the tape, the flexibility of the fibrous layer and metallic strip permitting conformation of the tape to the shape of the weldment.

5. A backup tape for shielding the underside of a weldment joint comprising an elongated, flexible, thin, metallic strip, a flexible layer of fibrous material adhered to one face of said strip to expose side edge portions of said strip and a filler positioned between said layer of fibrous material and the weldment joint, said exposed side edge portions having an adhesive coating to provide a substantially air-tight sealing engagement with the weldment joint along both edges of the tape, the flexibility of the fibrous layer and metallic strip permitting conformation of the tape to the shape of the weldment.

6. A backup tape for shielding the underside of a weldment joint comprising a central flexible layer of fibrous material, a pair of elongated, thin, flexible, metallic strips adhered to opposite side edges of one face of said layer of fibrous material exposing both faces thereof and an elongated, thin, flexible, metallic cover covering the entire exposed portion of said one face of said fibrous layer, said exposed side edge portions having an adhesive coating to provide a substantially air-tight sealing engagement with the weldment joint along both edges of the tape, the flexibility of the fibrous layer and metallic strips permitting conformation of the tape to the shape of the weldment.

7. A backup tape for shielding the underside of a weldment joint comprising an elongated, flexible metallic strip, a central layer of fibrous material adhered to one face of said strip and being of a narrower width than said strip and a filler cord disposed between said strip and said layer of fibrous material.

8. A backup tape as claimed in claim 7 wherein said flexible metallic strip is between 0.003 and 0.009 inch in thickness.

9. A backup tape as claimed in claim 7 wherein said flexible metallic strip is made of an aluminum alloy.

10. A backup tape as claimed in claim 7 wherein said flexible metallic strip is made of a copper alloy.

11. A backup tape as claimed in claim 7 wherein said flexible metallic strip is a corrosion resistant, non-magnetic steel.

12. A backup tape as claimed in claim 7 wherein said central layer is made of a woven glass cloth.

References Cited

UNITED STATES PATENTS

| | | | |
|---|---|---|---|
| 2,362,505 | 11/1944 | Smith | 228—50 |
| 2,395,668 | 2/1946 | Kellgren et al. | 206—59 |
| 2,792,626 | 5/1957 | Chyle | 228—50 |
| 2,820,427 | 1/1958 | Chyle et al. | 29—491 |
| 3,001,057 | 9/1961 | Hackman et al. | 29—491 |
| 3,223,823 | 12/1965 | Keller | 219—127 |

RICHARD M. WOOD, *Primary Examiner.*

B. A. STEIN, *Assistant Examiner.*